Jan. 10, 1967  M. KAPILOW  3,296,926
MOTION PICTURE FILM EDITOR
Original Filed Aug. 3, 1964  6 Sheets-Sheet 1

INVENTOR
MARVIN KAPILOW
BY
Kane, Dalsimer & Kane
ATTORNEYS

Jan. 10, 1967  M. KAPILOW  3,296,926
MOTION PICTURE FILM EDITOR
Original Filed Aug. 3, 1964  6 Sheets-Sheet 2
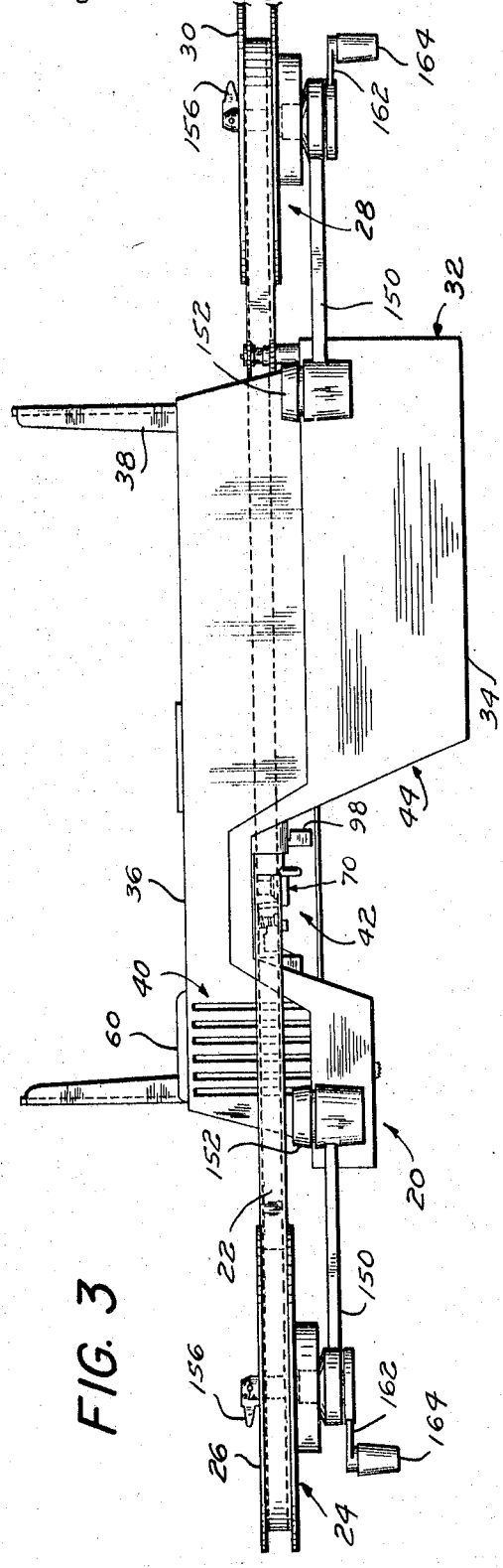
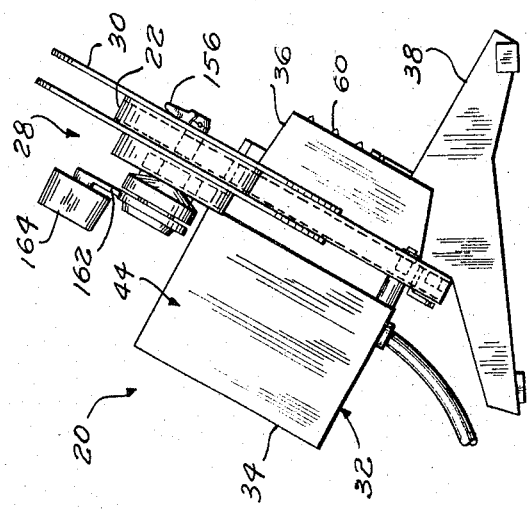
INVENTOR
MARVIN KAPILOW
BY
Kane, Dalsimer + Kane
ATTORNEYS

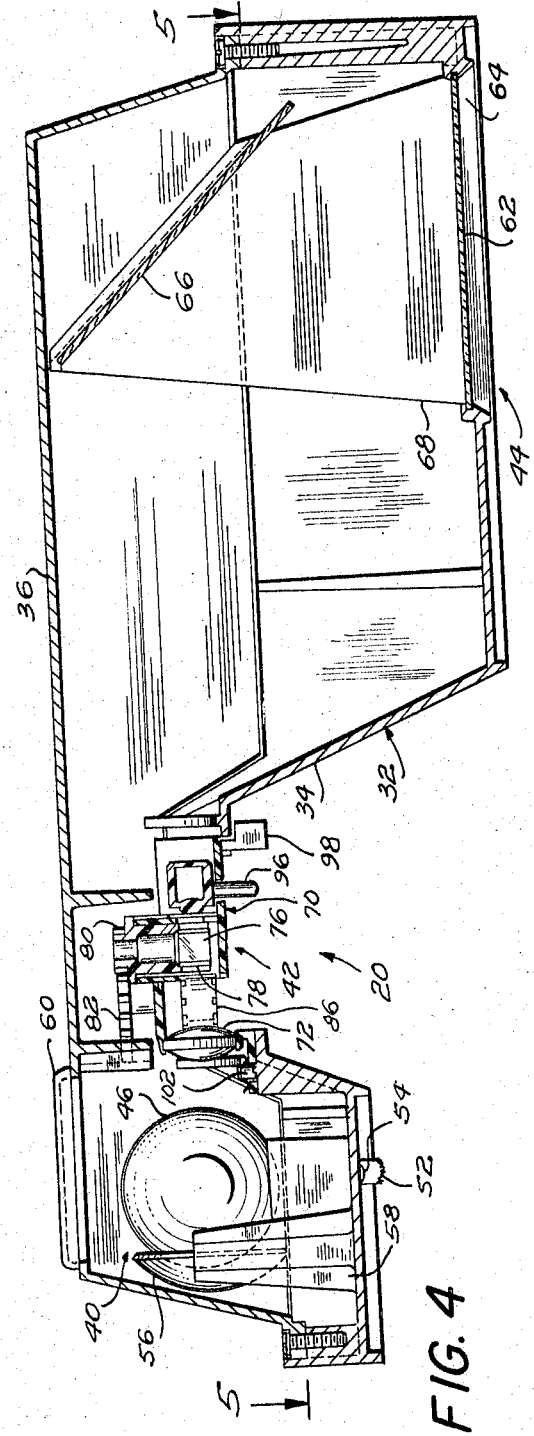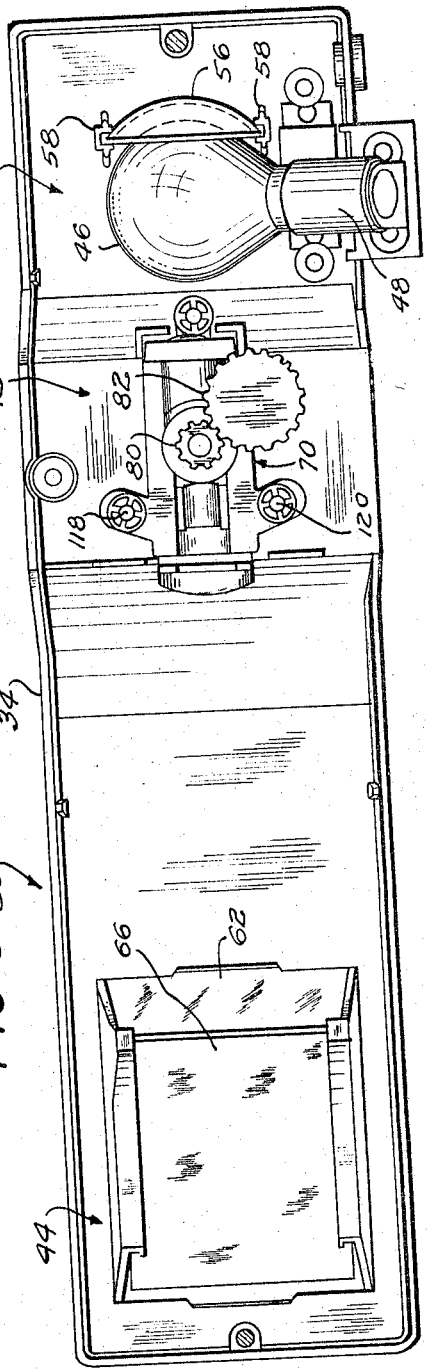

Jan. 10, 1967   M. KAPILOW   3,296,926
MOTION PICTURE FILM EDITOR
Original Filed Aug. 3, 1964   6 Sheets-Sheet 4

INVENTOR
MARVIN KAPILOW
BY
Kane, Dalsimer & Kane
ATTORNEYS

INVENTOR
MARVIN KAPILOW
BY
Kane, Dalsimer & Kane
ATTORNEYS

United States Patent Office 3,296,926
Patented Jan. 10, 1967

3,296,926
MOTION PICTURE FILM EDITOR
Marvin Kapilow, Rye, N.Y., assignor to Kamar Products Inc., Irvington-on-Hudson, N.Y., a corporation of New York
Continuation of application Ser. No. 386,968, Aug. 3, 1964. This application Sept. 22, 1964, Ser. No. 402,052
14 Claims. (Cl. 88—28)

This application is a continuation of application Serial No. 386,968 filed August 3, 1964, now abandoned. This invention relates to a motion picture film editor and, more particularly, to an improved editor design adapted to perform with optimum reliability and in accordance with construction and manufacturing techniques contributing to a relatively low cost item.

Heretofore, many forms and versions of editors have been proposed from the relatively simple low cost, while somewhat inaccurate, designs to the rather sophisticated, complex and accurate and expensive designs. None, however, have been able to successfully combine accuracy and reliability with attendant reduction in construction and manufacturing costs. It is towards this end that the present invention is particularly directed.

It is, therefore, a principal object of this invention to provide an accurate, reliable and low cost motion picture film editor while at the same time providing an editor possessing aesthetically pleasing design characteristics.

Other objects and advantages will become apparent from the following detailed description which is to be taken in conjunction with the accompanying drawings illustrating a somewhat preferred embodiment of the invention and in which:

FIG. 2 is an end elevational view thereof;

FIG. 3 is a top plan view thereof;

FIG. 4 is a sectional view taken along line 4—4 of FIG. 1 showing the interior of the editor housing;

FIG. 5 is a sectional view taken along line 5—5 of FIG. 4;

Figure 1:
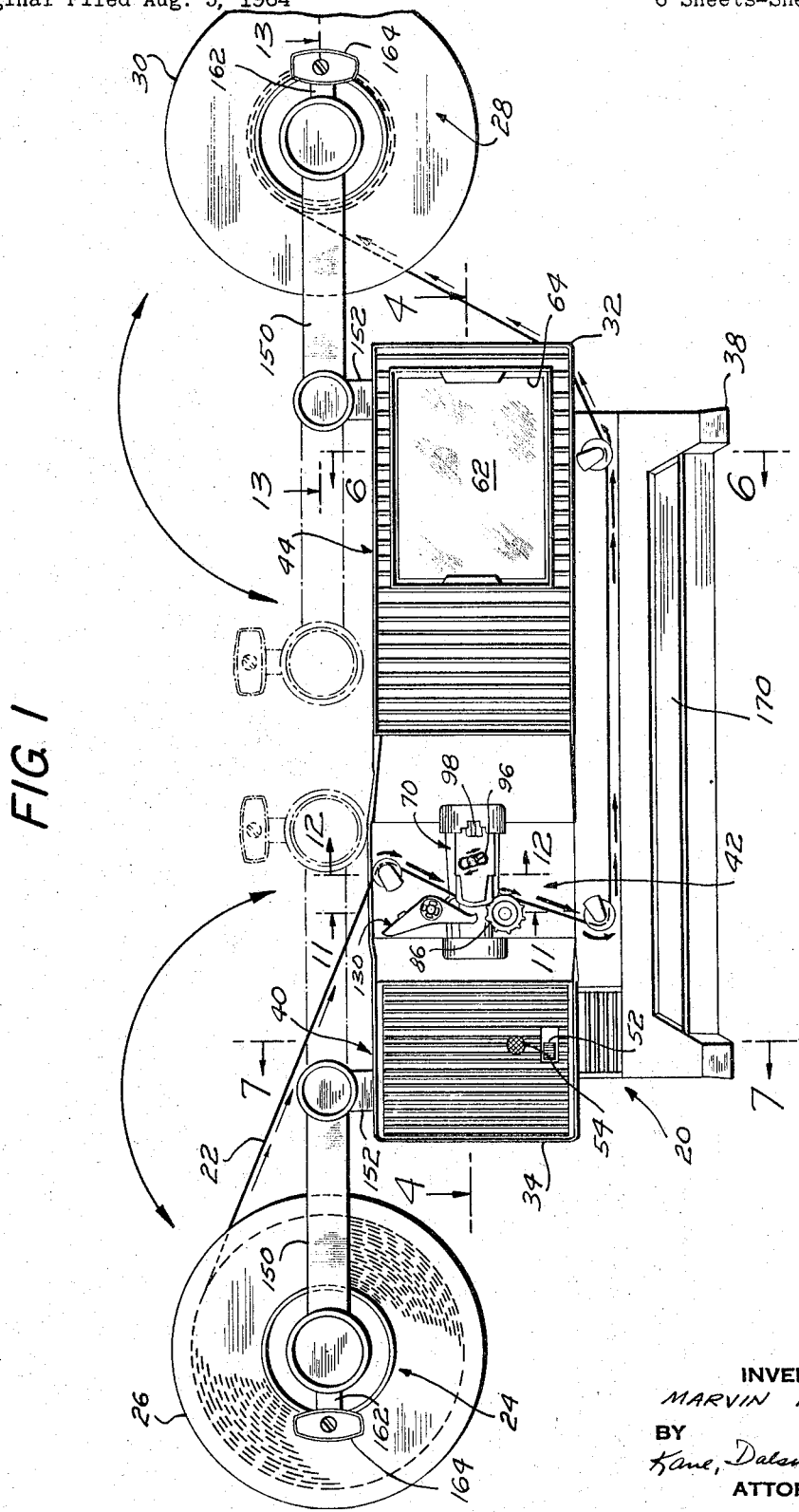
FIG. 1 is a front elevational view of an editor incorporating the teachings of this invention and having associated therewith a reel of film to be edited having its web properly threaded through the editor and onto a takeup reel.
Figure 6:
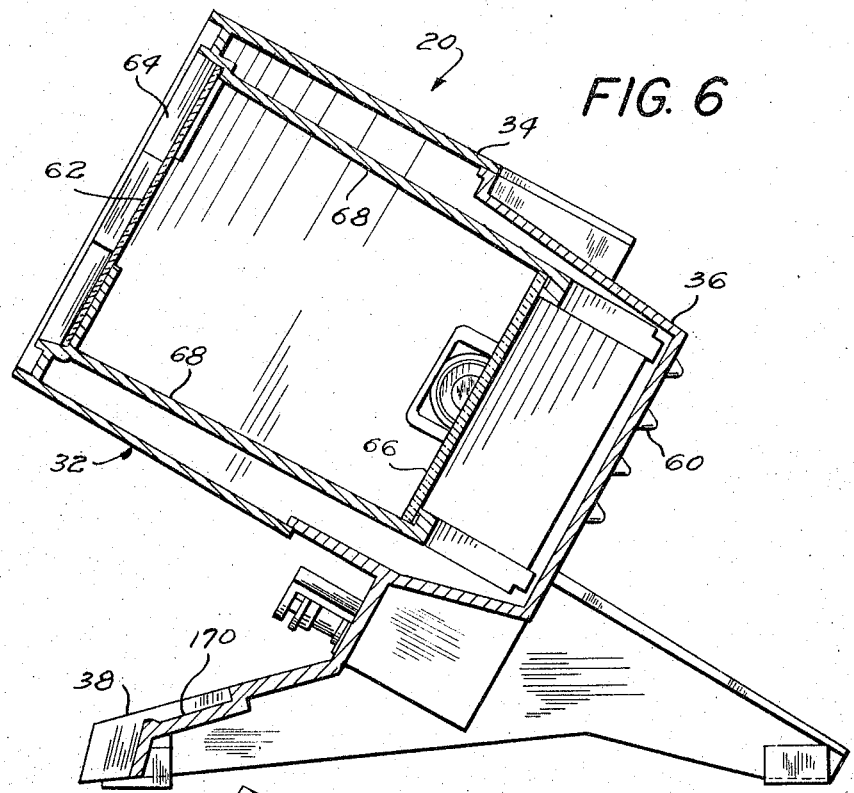
FIG. 6 is a sectional view taken along line 6—6 of FIG. 1 at the image reflecting projecting station.
Figure 7:
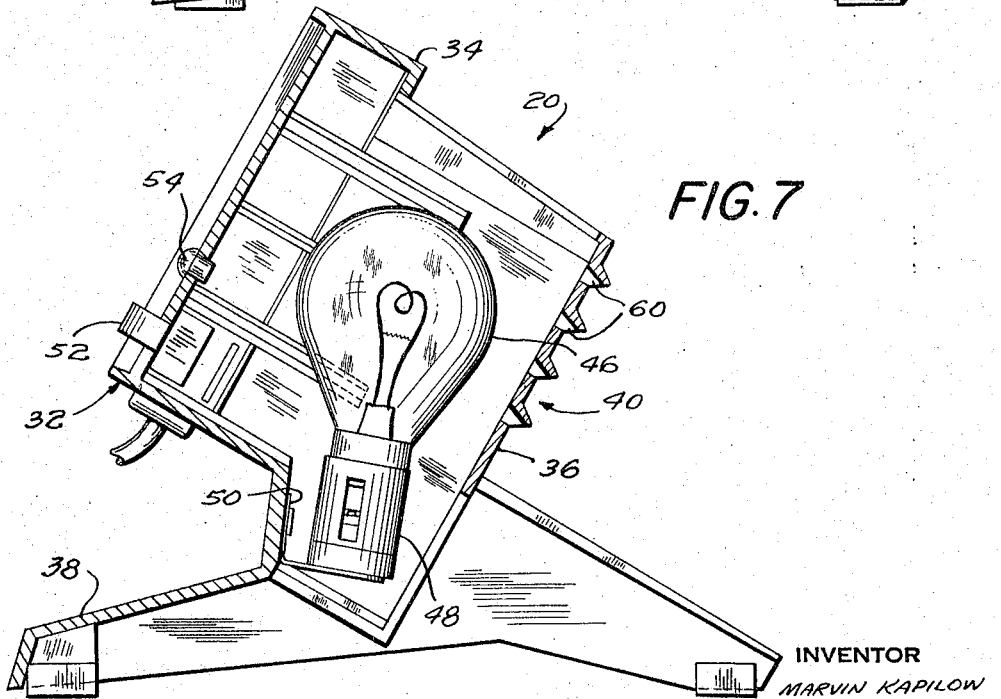
FIG. 7 is a similar sectional view taken along line 7—7 of FIG. 1 at the illuminating station.
Figure 8:
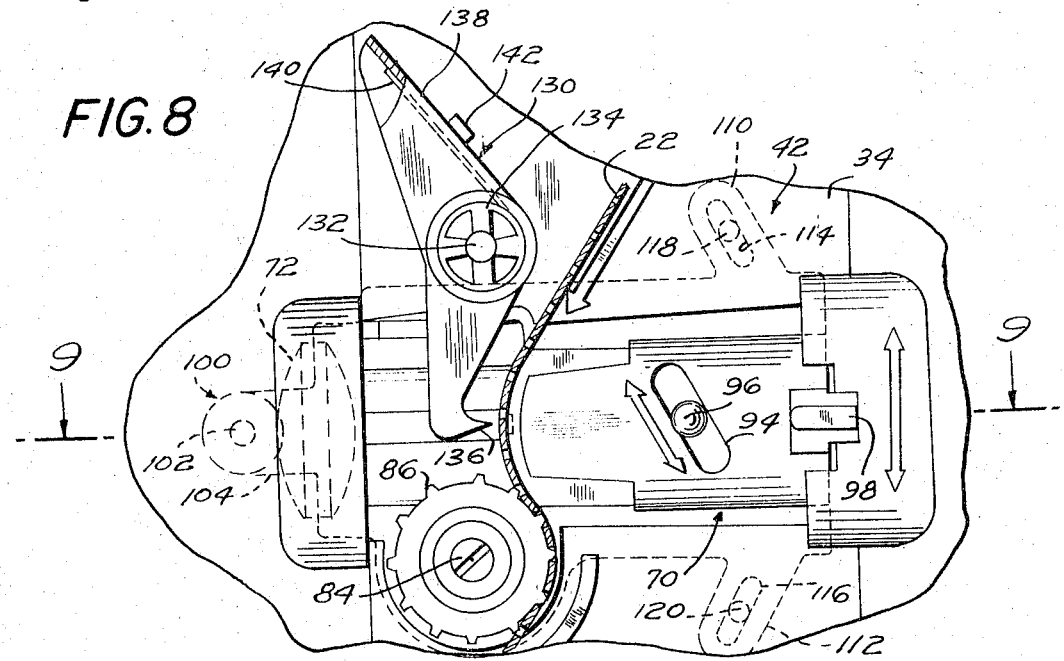
FIG. 8 is an enlarged fragmentary elevational view of the shutter and focus station of the optical system having associated therewith a conveniently located editing tool for marking by way of perforations, the desired frame or frames.
Figure 9:
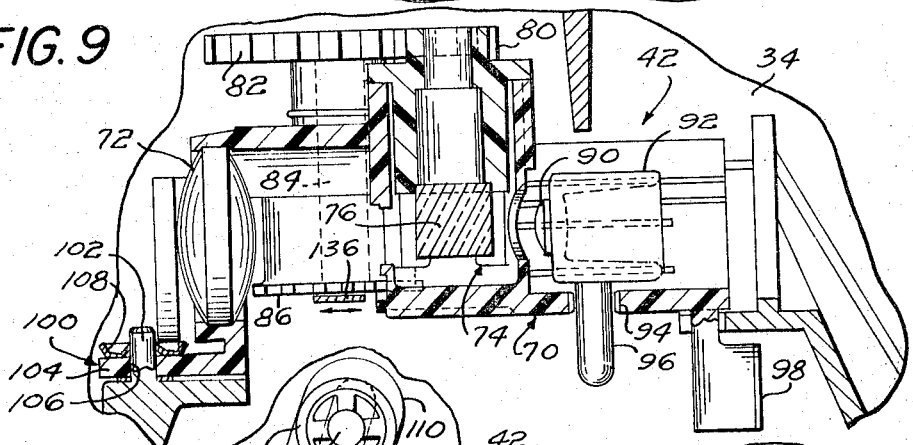
FIG. 9 is a sectional view taken along line 9—9 of FIG. 8 through the optics constituting the shutter and focusing means.
Figure 10:
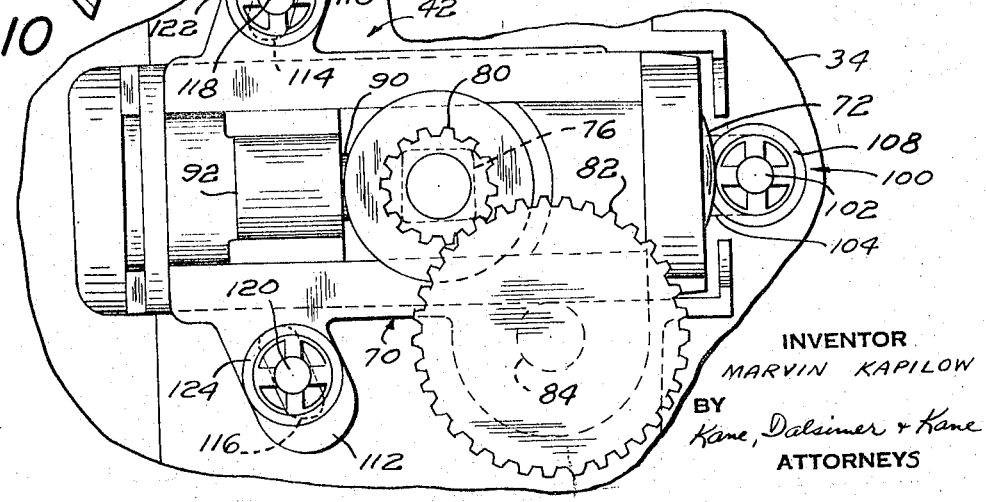
FIG. 10 is an enlarged fragmentary elevational view of the interior side of the shutter and focus station showing the drive means for the shutter and pivoting means enabling the optical axis to be shifted in a vertical direction in properly placing the image on the viewing screen.
Figure 11:
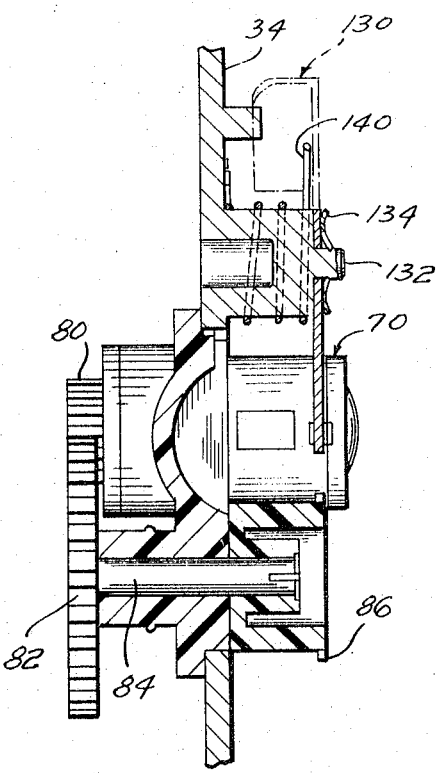
FIG. 11 is an enlarged fragmentary sectional view taken along line 11—11 of FIG. 1 showing details of the editing tool and associated parts of the shutter and focus station.
Figure 12:
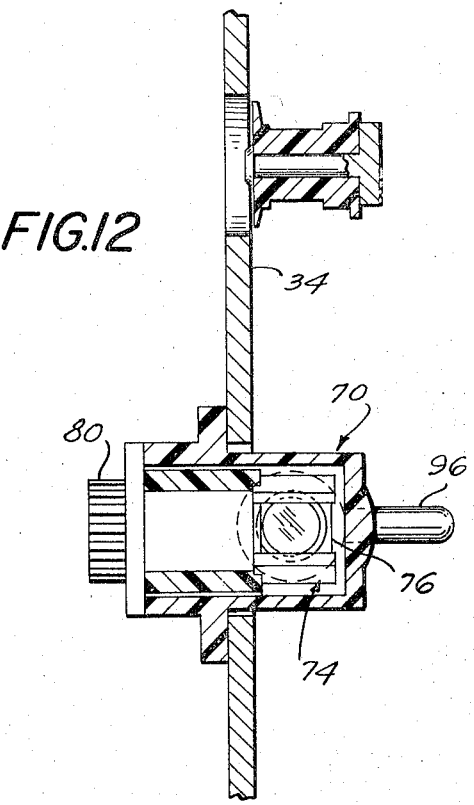
FIG. 12 is an enlarged fragmentary sectional view taken along line 12—12 of FIG. 1 along the axis of the rotatable shutter.
Figure 13:
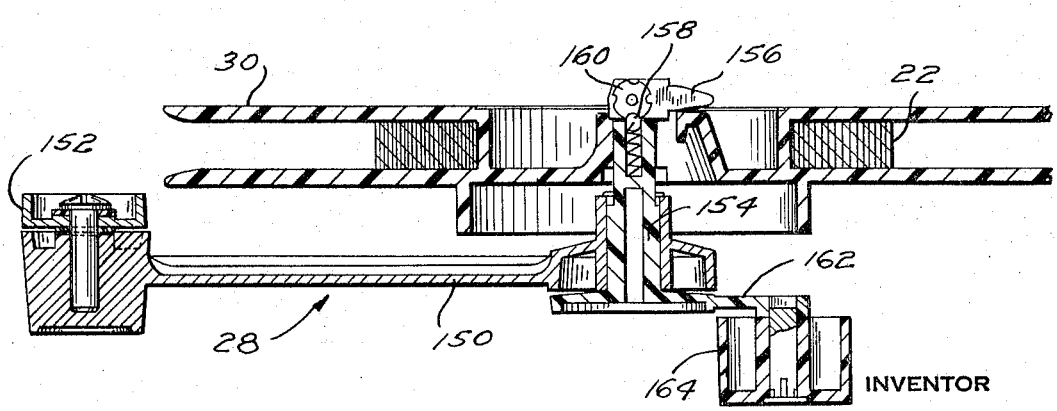
FIG. 13 is an enlarged sectional view taken along line 13—13 of FIG. 1 showing the details of the manual drive of the takeup reel which is duplicated at the rewind reel station.

In the drawings, an editor 20 is shown through which film 22 to be edited and viewed is adapted to be handled and processed. This film is conveniently mounted at the rewind station 24 on a reel 26 with its web eventually passing to the takeup station 28 for winding on the takeup reel 30. The viewer 20 is provided with a housing 32 conveniently formed of two parts, notably, a front part 34 and a rear part 36 which also advantageously provides the supporting base 38 for the editor. In this manner the housing 32 defines an illuminating station 40 for illuminating the frame to be viewed of the film 22 guided and threaded through the shutter and focus station 42 mounted intermediately by the housing 32. The other end of the housing 32 defines an image reflecting and projecting station 44 for presenting the image of the frame disposed at the shutter and focus station on a viewing screen.

It should be appreciated that the stations 40, 42 and 44 are cooperatively positioned through the employment of a housing 32 formed basically only of two parts. These parts are readily cast of suitable material having the desired low reflective operative properties.

Referring to the illuminating station 44, adapted to supply the requisite intensity of light to the station 42, a suitably rated lamp 46 is mounted on the interior of the housing 32 for such purposes. This lamp 46 is received in the socket 48 supported by an inwardly extending wall bracket 50. The energization of the lamp is controlled by an externally actuated switch 52. The illumination of the lamp 46 may be readily observed by the glow of a suitably colored glass button 54. A reflector 56 is also interiorly mounted in a pair of inwardly extending tracks 58 of the front part 34 of the housing; that is the reflector serves to intensify the light of the lamp 46 that is directed to the shutter and focus station along the optical axis thereof. In order to facilitate air circulation and consequently lower the temperature at the illuminating station 40, the housing 32 is conveniently provided with a network of vents 60.

The projecting station 44 is located at the other end of the housing 32 and includes a rear projection screen 62 extending across an opening 64 in the front part 34 of the housing. This screen 62 receives the projected image thereon for viewing and editing purposes. In this connection a reflecting mirror 66 at this station, and mounted by inwardly extending arms 68 of the front 34 of the housing, reflects and directs the image onto the screen.

The shutter and focus station 42 disposed between the illuminating station 40 and viewing station 44 conveniently exposes a single frame at a time of the film 22 and focuses it on a screen 62 after reflection by the mirror 66. This station accordingly includes a lens system comprising a casing 70. As will be readily apparent from the drawings, a condensing lens 72 serves to transmit the light rays emanating from the lamp 46 along converging paths with respect to the optical axis of the lens system. These light rays then pass through the frame of the film 22 located at the shutter and focus station. A shutter 74 is provided by the square prism 76 having opaque strips 78 at its four corners. As will be appreciated, the disposition of the prism 76 whereby a side face thereof is disposed substantially parallel the plane of the frame of the film 22 to be exposed will result in the projection of this frame on the screen 62. The shutter 74 is substantially tubular in configuration and is conveniently adapted to be rotated in synchronization with the linear of the film 22.

In this connection, the shutter 76 is formed with a gear 80 adapted to mesh with the teeth of gear 82 fixed to a rotatable shaft 84. The shaft extends through the casing 70 of the lens system and fixedly mounts the sprocket wheel 86, the teeth of which are adapted to engage with the sprocket openings of the film 22. In these circumstances the movement of the film across the optical axis of the lens system causes rotation of the sprocket wheel 86 which in turn will actuate the shutter 74 through the intermediate gear 82.

The transmitted image of the frame to be viewed passes through a focal lens 90 having a peripheral tubular extension 92 slidably disposed in the lens system casing 70. Longitudinal movement of this lens 90 along the optical axis of the lens system will accordingly focus the transmitted image of the frame on the viewing screen 62. This movement of the focal lens 90 is provided by a cam and cam follower arrangement including an obliquely oriented slot 94 in the casing 70 and a laterally projecting pin 96 integral with the tubular extension 92. This pin 96 projects through the slot 94 and its movement therein will serve to rotate the focal lens 90 but at the same time shift it longitudinally along the optical axis in arriving at the desired focus.

In order to assure the desired and optimum projection of the frame on the viewing screen 62, a matter which may give rise to some concern particularly in view of the minimization of critical production tolerances of the parts of the editor herein, the entire shutter and focus station is adapted to be pivotal in a vertical direction with respect to the optical axis of the lens system. The casing 70 is accordingly pivotal with respect to the housing 32 by means of the pivotal connection 100 including the inwardly extending pin 102 of the housing 32 and the journaled extension 104 of the casing 70 having the pin accommodating bore 106. This pivotal relationship is maintained by means of lock washer 108. In completing the means for permitting this movement of the station 42, laterally extending arms 110 and 112 of the casing 70 are each provided with slots 114 and 116, respectively. The slots are adapted to receive inwardly projecting pins 118 and 120 of the housing front 34. Lock washers 122 and 124 placed on the free ends of these pins serve to retain the casing 70 in place while permitting its pivotal movement about pin 102 and relative to pins 118 and 120. In this manner the proper placement of the frame image is relatively simple and inexpensively accomplished.

An editing tool 130 is pivotally mounted on the housing front 34 by means of the outwardly projected pin 132. A lock washer 134 retains the tool in place while permitting the pivotal movement. In this connection a puncturing tip or point 136 is disposed adjacent the optical axis of the lens system to assure marking of the proper frame of the film to be edited. The tool 134 is provided with a finger engaging end 138 against which finger pressure is exerted in manipulating the tool. A coil spring 140 biases the tool 130 away from the film 22. A stop 142 projecting outwardly from the housing front 34 limits the extent of movement of the tool while under the influence of the spring 140.

The rewind reel station and the takeup reel station are of substantially similar construction. Accordingly, only the rewind reel station will be described in detail with like parts being similarly numbered at the takeup station. Thus, an arm 150 is pivotally mounted on an upwardly extending part 152 of the housing rear 36. This arm is pivotal from an inwardly extending position overlying the housing 32, which facilitates storage or shipping of the editor, to an outwardly extending position beyond the associated end of the housing 32 at which the editor is in a position to be used.

The reel 26 is adapted to be mounted on the shaft 154 in turn pivotally mounted by the free end of the arm 150. The film reel is disposed over the shaft in usual fashion and keyed thereto by means of the pivotal key 156 adopted to be disposed in radially extending slots in the reel in customary fashion. A spring biased ball 158 conveniently cooperates with recesses 160 in the key for determining the open and closed position for the key.

The other end of the shaft 154 is coupled with a crank including crank arm 162 and rotatable crank handle 164. This construction thereby permits the reel 30 to be turned by simply turning the crank while grasping the handle 164.

The web of the film 22 on the reel 26 is threaded and guided through the editor and particularly the shutter and focus station 42 as shown in FIG. 1 onto the takeup reel 30. After connecting the lamp 46 to a suitable source of electrical energy, switch 54 is actuated to energize the lamp. The film threaded on the sprocket wheel 86 causes its rotation together with that of the shutter 74 to expose one frame at a time onto the viewing screen 62. The pin 96 is shifted to move the focal lens 94 in arriving at the desired focus of the image on the screen 62. In addition, the entire shutter and focus station is pivoted by merely applying finger pressure to the arm 98 to assure the proper disposition of the projected image on the screen 62. When it is desired to mark a particular frame that is being viewed the tool 130 need only be actuated. Also, a suitable scene timing scale 170 in feet per second may be placed on the base 38 of the housing adjacent to the path of travel of the film 22 as shown. In this manner the film passing through the editor and the scale 170 will be readily accessible and close to one another for purposes of facilitating the editing process.

Thus, among others the several aforenoted objects are most effectively attained. Although a single, somewhat preferred embodiment has been disclosed in detail herein, it should be understood that this invention is in no sense limited thereby but is to be determined by the scope of the appended claims.

What is claimed is:

1. An editor for motion picture film comprising: a housing having a front, a rear and a supporting base; a rewind reel station having a reel of the film to be edited and being supported by the housing; an illuminating station mounted interiorly at one end of the housing for providing a beam of light for illuminating frames of the film to be edited; a viewing station at the other end of the housing and having a rear projection screen on which the image of the frames is adapted to be projected for viewing; a shutter and focusing station on the housing between its ends for directing and focusing the image of the illuminated frames onto the screen, the shutter and focus station being movable relative to the housing for adjustably directing the projected image onto the screen; and editing tool means supported by the housing adjacent the shutter and focusing station for marking selected frames of the film to be edited.

2. The invention in accordance with claim 1 wherein the housing is formed of essentially two connected parts, the first part providing the rear and base and the second part providing the front.

3. The invention in accordance with claim 1 wherein at least one of the reel stations comprises an arm pivotally mounted from a collapsed position over the housing for storage purposes to an extended operative position beyond the associated end of the housing, and reel mounting means at the free end of the arm for mounting a reel.

4. The invention in accordance with claim 3 wherein the reel mounting means includes a shaft rotatable on the free end of the arm and extending laterally therefrom, a reel adapted to be mounted on the shaft, and means in the shaft for keying the reel on the shaft for rotation therewith, and a crank having one end secured to the shaft for rotating the reel thereon to move the film.

5. The invention in accordance with claim 1 wherein the illuminating station includes an interiorly mounted lamp, a reflector adjacent the lamp for cooperating in directing a beam of light towards the shutter and focusing station, switch means extending through the front of the housing for energizing the lamp and vent means in the housing for cooperating in cooling the illuminating station.

6. The invention in accordance with claim 5 wherein the screen is on the front of the housing and a reflecting means is interposed between screen and the shutter and focus station for reflecting the projected image therefrom on to the screen.

7. The invention in accordance with claim 1 wherein the shutter and focusing station includes a shutter disposed on the path of the beam of light and being actuatable to expose a frame at a time of the film to the beam of light to thereby cooperate in only projecting a whole frame on the screen, a sprocket wheel coupled with the shutter and having teeth adapted to engage with the sprocket openings of the film to be edited whereby movement of the film will result in synchronous actuation of the shutter.

8. The invention in accordance with claim 1 wherein the shutter and focus station includes a lens system having an optical axis coinciding with the beam of light, and focus adjusting means for adjusting the focus of the projected image on the screen.

9. The invention in accordance with claim 8 wherein the lens system includes a casing and a focal lens slidably mounted by the casing, and cam and cam follower means provided by surfaces of the focal lens and casing whereby selected camming of the cam and cam follower will produce relative long turning shifting of the focal lens and thereby adjust the focus of the projected image on to the screen.

10. The invention in accordance with claim 8 wherein the lens system includes a condensing lens for directing the light rays emanating from the illuminating station along converging paths.

11. The invention in accordance with claim 7 wherein the shutter and focus station is movable relative to the housing for adjustably directly the projected image on to the screen while maintaining the synchronous drive coupling between the shutter and sprocket wheel.

12. The invention in accordance with claim 1 wherein the shutter and focus means is mounted on the front of the housing such that it may be selectively adjusted.

13. The invention in accordance with claim 1 wherein the editing tool means includes an elongated member pivotally mounted on the front of the housing, said member having a finger engaging portion and a puncturing point for marking the film upon pivoting of the member through forceful egagement of the finger engaging portion.

14. The invention in accordance with claim 13 wherein a spring means normally biases the member away from the film and is adapted to be overcome by applying finger pressure to the finger engaging portion.

References Cited by the Examiner

UNITED STATES PATENTS

| 1,533,546 | 4/1925 | Hall | 352—242 |
| 2,218,256 | 10/1940 | Bechtel | 352—29 X |
| 2,576,586 | 11/1951 | Frankel | 88—24 X |
| 2,905,050 | 9/1959 | Castedello et al. | 88—24 X |
| 2,906,167 | 9/1959 | Castedello et al. | 352—129 X |
| 3,225,648 | 12/1965 | Toler | 88—24 |

JOHN M. HORAN, *Primary Examiner.*

NORTON ANSHER, *Examiner.*

V. A. SMITH, *Assistant Examiner.*